US009619945B2

(12) United States Patent
Adderly et al.

(10) Patent No.: US 9,619,945 B2
(45) Date of Patent: Apr. 11, 2017

(54) RECOMMENDING AN ALTERNATIVE ROUTE TO A SERVICE LOCATION TO SERVICE A VEHICLE ISSUE THAT WAS DETECTED BY A CHANGE IN STATUS IN A SENSOR OF THE AUTOMOBILE'S DIAGNOSTIC SYSTEM

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 14/669,281

(22) Filed: Mar. 26, 2015

(65) Prior Publication Data
US 2016/0284138 A1    Sep. 29, 2016

(51) Int. Cl.
*G06F 11/30* (2006.01)
*G07C 5/00* (2006.01)
(Continued)

(52) U.S. Cl.
CPC ............ *G07C 5/006* (2013.01); *G01C 21/34* (2013.01)

(58) Field of Classification Search
CPC .... G07C 5/006; G07C 5/0808; G07C 5/0816; G01C 21/34; G01C 21/00; G01C 21/3407; G01C 21/3415
(Continued)

(56) References Cited

U.S. PATENT DOCUMENTS 6,996,469 B2   2/2006 Lau et al.
7,502,672 B1 * 3/2009 Kolls .................. G06Q 30/02
                                                    340/988
(Continued)

FOREIGN PATENT DOCUMENTS

EP     2472230 A2    7/2012
JP     11094576 A  * 4/1999
JP   2000046573 A  * 2/2000 ............ G01C 21/00

OTHER PUBLICATIONS

Garmin, "Garmin ecoRoute HD Vehicle Diagnostics Communicator," http://www.amazon.com/Garmin-ecoRoute-Vehicle-Diagnostics-Communicator/dp/B00313JWSO, 2013, pp. 1-7.
(Continued)

*Primary Examiner* — Jaime Figueroa
(74) *Attorney, Agent, or Firm* — Robert A. Voigt, Jr.; Winstead, P.C.

(57) ABSTRACT

A method, system and computer program product for assisting a user in handling a vehicle service issue. A profile is created by a navigation system that stores preferences of the user, such as vehicle and vehicle service preferences (e.g., tire brands). The navigation system polls the vehicle sensors in the automobile diagnostic system periodically to interpret a status. If there has been a change in the status of a sensor (e.g., change in tire pressure) and if the change represents a service issue to be addressed, then a service issue has been identified. The navigation system then determines a change in the route the vehicle is currently traveling to reach a service destination (e.g., Discount Tire® store) to address the service issue (e.g., low tire pressure) taking into consideration the user's preferences (user's profile specified the Discount Tire® chain to handle all service issues relating to tires).

15 Claims, 3 Drawing Sheets

(51) Int. Cl.
  *G01M 17/00* (2006.01)
  *G06F 7/00* (2006.01)
  *G06F 19/00* (2011.01)
  *G01C 21/34* (2006.01)

(58) Field of Classification Search
  USPC .............. 701/1, 32.3, 32.7, 33.6, 34.3, 34.4
  See application file for complete search history.

(56) References Cited

U.S. PATENT DOCUMENTS

| | | | | |
|---|---|---|---|---|
| 8,041,779 | B2 * | 10/2011 | Habaguchi | G06Q 10/063 |
| | | | | 340/7.46 |
| 8,099,308 | B2 * | 1/2012 | Uyeki | G06Q 10/02 |
| | | | | 340/539.1 |
| 9,229,904 | B2 * | 1/2016 | Knoop | G06F 17/00 |
| 2004/0021583 | A1 * | 2/2004 | Lau | G01C 21/3617 |
| | | | | 340/995.19 |
| 2006/0247832 | A1 * | 11/2006 | Taki | G06Q 10/02 |
| | | | | 701/31.4 |
| 2009/0292417 | A1 * | 11/2009 | Ishikawa | G07C 5/008 |
| | | | | 701/31.4 |
| 2011/0071720 | A1 * | 3/2011 | Schondorf | G06Q 10/06 |
| | | | | 701/29.5 |
| 2012/0078509 | A1 * | 3/2012 | Choi | G01C 21/3461 |
| | | | | 701/423 |
| 2012/0116609 | A1 * | 5/2012 | Jung | B60R 16/0234 |
| | | | | 701/2 |
| 2012/0136802 | A1 * | 5/2012 | McQuade | G06Q 30/0282 |
| | | | | 705/347 |
| 2014/0324275 | A1 * | 10/2014 | Stanek | G07C 5/0816 |
| | | | | 701/31.4 |

OTHER PUBLICATIONS

OnStar, http://en.wikipedia.org/wiki/OnStar, 2013, pp. 1-7.
Sam Costello, "Top 5 Gas Station Finder Apps," http://ipod.about.com/od/bestiphoneapps/tp/Top-Fuel-Station-Finder-Apps.htm, 2013, pp. 1-5.
Waze, "Waze Social GPS Maps & Traffic," https://play.google.com/store/apps/details?id=com.waze&hl=en, 2013, pp. 1-2.
Sprint, "Sprint Velocity," http://velocity.sprint.com/velocity, 2013, pp. 1-5.

* cited by examiner

RECOMMENDING AN ALTERNATIVE ROUTE TO A SERVICE LOCATION TO SERVICE A VEHICLE ISSUE THAT WAS DETECTED BY A CHANGE IN STATUS IN A SENSOR OF THE AUTOMOBILE'S DIAGNOSTIC SYSTEM

TECHNICAL FIELD

The present invention relates generally to vehicle navigation systems, and more particularly to recommending an alternative route to a service location to service a vehicle issue that was detected by a change in status in a sensor of the automobile's diagnostic system.

BACKGROUND

There is an increasing use of Global Positioning System (GPS)-based navigation systems in vehicles. Such navigation systems receive signals from an array of satellites which are part of the GPS. Based on received signals, GPS-based navigation systems may identify a vehicle's location in terms of latitude and longitude. The navigation system may also detect the vehicle's speed and direction of travel. With geographic information stored in an on-board computer in the vehicle, the navigation system is capable of audio-visually communicating to a user instructions for reaching a given destination.

Currently, GPS-based navigation systems may be implemented as a stand-alone GPS unit, a GPS application on a mobile computing device (e.g., smartphone) or as a unit integrated with the vehicle's entertainment system. Currently, such GPS-based navigation systems are good at providing directions and can incorporate various types of information, such as traffic information, to provide a route to the driver that would exclude traffic congestion, accidents, etc.

However, such systems do not incorporate any information from the vehicle's diagnostic system which may indicate a service issue (e.g., low fuel) that needs to be addressed. For example, the driver only becomes aware of having low fuel in response to the low fuel indicator light appearing. The driver may then open an application (e.g., GasBuddy®) on the driver's mobile computing device to attempt to identify the closest gas station. The driver would then have to enter the destination of the closest gas station in the navigation system to obtain the directions to the closest gas station. Such a process is labor intensive and inefficient. If, however, the navigation system integrated data from the vehicle's diagnostic system, then the navigation system may be able to assist the user in handing the service issue thereby improving the current process in handling such a situation.

BRIEF SUMMARY

In one embodiment of the present invention, a method for assisting a user in handling a vehicle service issue comprises creating a profile storing a user's vehicle and vehicle service preferences. The method further comprises receiving a destination from a user. The method additionally comprises determining a route to travel from a current location of the vehicle to the destination. Furthermore, the method comprises polling sensors in an automobile diagnostic system of the vehicle periodically to interpret a status. Additionally, the method comprises detecting a change in the status of a sensor in the sensors of the automobile diagnostic system. In addition, the method comprises identifying a service issue in response to the change in the status of the sensor prior to the automobile diagnostic system notifying the user regarding the service issue. The method further comprises determining, by a processor, a recommended change in the route to reach a service destination to address the service issue taking into consideration the user's vehicle and vehicle service preferences in response to identifying the service issue. The method additionally comprises displaying a notification to the user regarding the service issue and the recommended change in the route to reach the service destination to address the service issue.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
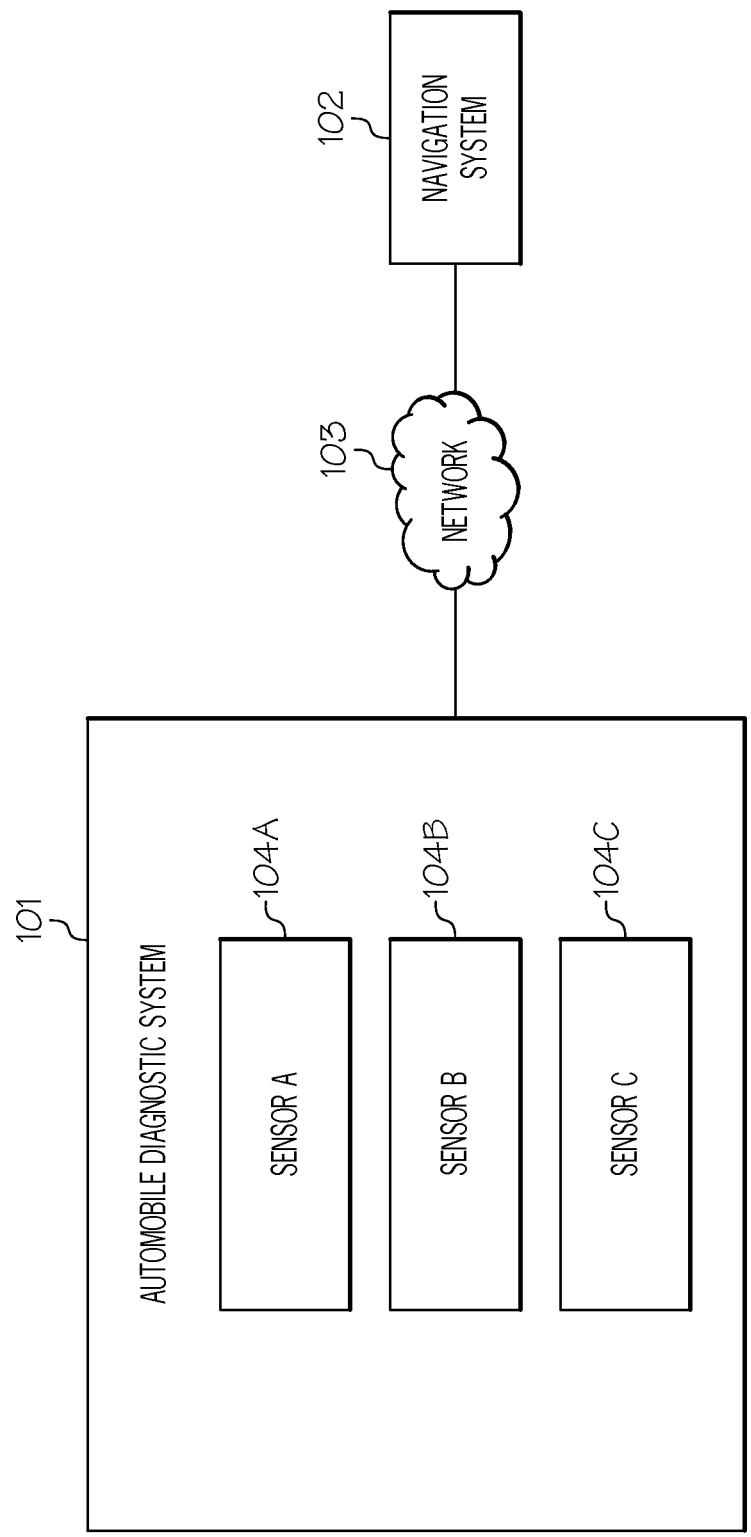
FIG. 1 illustrates a communication system configured in accordance with an embodiment of the present invention.

The present invention comprises a method, system and computer program product for assisting a user in handling a vehicle service issue. In one embodiment of the present invention, a profile is created by a navigation system that stores preferences of the user (e.g., driver of the vehicle), such as vehicle and vehicle service preferences (e.g., specific gas stations, tire brands). The navigation system polls the vehicle sensors in the automobile diagnostic system periodically to interpret a status. For example, the navigation system may poll a sensor in the automobile diagnostic system to determine if there has been a change in the tire pressure. If there has been a change in the status of a sensor (e.g., change in tire pressure) and if the change represents a service issue to be addressed (e.g., change in tire pressure from 32 psi to 26 psi), then a service issue has been identified. A "service issue," as used herein, refers to any vehicle issue that should be serviced for the safety of the vehicle occupants as well as to ensure that the vehicle continues to operate in good working order, such as by performing preventative or routine maintenance. The navigation system then determines a change in the route the vehicle is currently traveling to reach a service destination (e.g., Discount Tire® store) to address the service issue (e.g., low tire pressure) taking into consideration the user's preferences (user's profile specified the Discount Tire® chain to handle all service issues relating to tires). A notification is then displayed to the user regarding the service issue and recommended change in the route to a service destination to address the service issue. In this manner, the navigation system assists the user (e.g., driver of a vehicle) in handling a service issue by having the navigation system identify a service issue prior to the automobile diagnostic system notifying the user regarding the service issue and recommending an alternative to the route the vehicle is currently traveling so as to reach a service destination to address the service issue.

While the following discusses the present invention in connection with polling sensors in an automobile diagnostic system, the principles of the present invention may be applied to polling road sensors that have sensed a characteristic of the environment that may be used by the navigation system to determine if there is a service issue to be addressed. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 configured in accordance with an embodiment of the present invention. Referring to FIG. 1, communication system 100 includes an automobile diagnostic system 101 of a vehicle (not shown) integrated with a navigation system 102. "Navigation system 102," as used herein, includes any GPS-based navigation systems that may be embodied as a stand-alone GPS unit, a GPS application on a mobile computing device (e.g., smartphone) or as a unit integrated with the vehicle's entertainment system. In one embodiment, navigation system 102 is integrated with automobile diagnostic system 101 wirelessly or wired. A description of the hardware configuration of navigation system 102 is provided below in connection with FIG. 2.

In one embodiment, navigation system 102 is connected to automobile diagnostic system 101 via a network 103, which may be, for example, a wireless wide area network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

As illustrated in FIG. 1, automobile diagnostic system 101 includes sensors 104A-104C (identified as "Sensor A," "Sensor B," and "Sensor C," respectively, in FIG. 1). Sensors 104A-104C may collectively or individually be referred to as sensors 104 or sensor 104. Each sensor 104 may be configured to measure a different characteristic of the vehicle (e.g., tire pressure, fuel level, level of engine oil, engine temperature, etc.). While FIG. 1 illustrates three sensors 104, automobile diagnostic system 101 may include any number of sensors 104 gathering various types of information about how the vehicle is performing. Such information may be utilized by navigation system 102 to identify a service issue prior to automobile diagnostic system 101 notifying the user (e.g., driver of the vehicle) regarding the service issue. Furthermore, the principles of the present invention include situations where navigation system 102 utilizes information from sensors 104 (e.g., compression is slow in cylinder number 3) to identify a service issue that would not be divulged to the driver at a later point in time by automobile diagnostic system 101. In response to identifying a service issue, navigation system 102 may recommend an alternative to the route the vehicle is currently traveling so as to reach a service destination to address the service issue as discussed further below in connection with FIG. 3.

Figure 2:
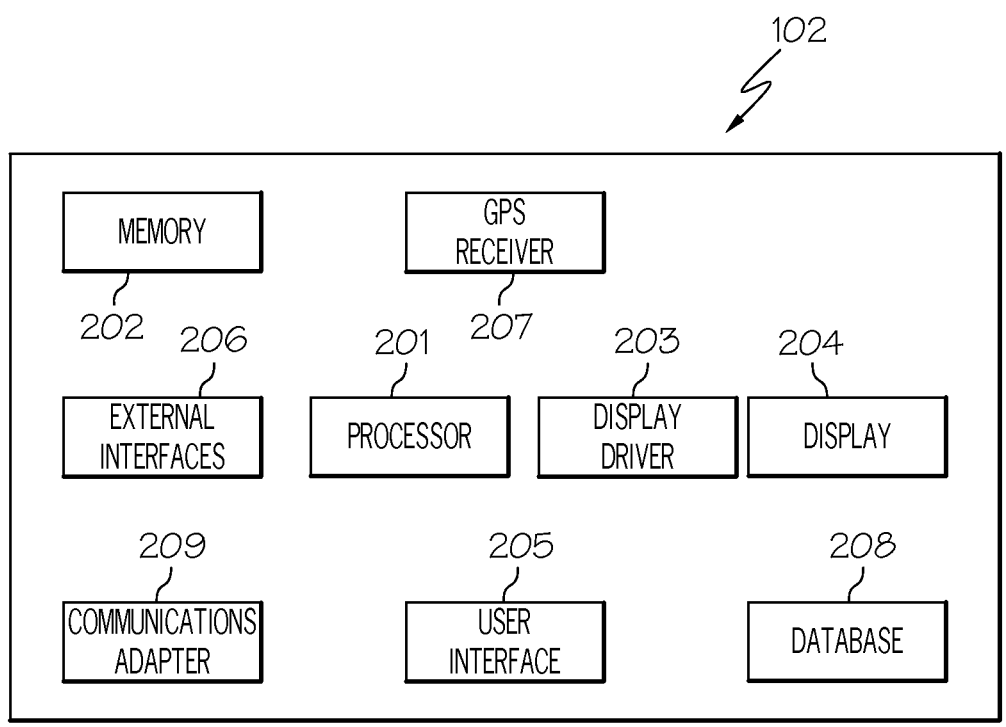
FIG. 2 illustrates a hardware configuration of a navigation system in accordance with an embodiment of the present invention.

FIG. 2 illustrates an embodiment of the present invention of navigation system 102 (FIG. 1). Referring to FIG. 2, navigation system 102 includes a processor 201, a memory 202, a display driver 203, a display 204, a user interface 205, external interfaces 206 and a Global Positioning System (GPS) receiver 207.

Memory 202 is used to store software and data for execution by processor 201 to carry out various operations of navigation system 102. In this instance, the stored software may include a navigator web browser for browsing information provided (e.g., by servers connected to the Internet). In particular, the navigator browser works compatibly with the standard hypertext transfer protocol (HTTP), hypertext markup language (HTML), virtual reality markup language (VRML), graphics interchange format (GIF), JAVA applets, etc. In one embodiment, the stored software may further include an application for assisting a user (e.g., driver of a vehicle) in handling a vehicle service issue as discussed further below in connection with FIG. 3. In one embodiment, the user will be assisted in handling a vehicle service issue by navigation system 102 identifying a service issue prior to automobile diagnostic system 101 (FIG. 1) notifying the user (e.g., driver of the vehicle) regarding the service issue and recommending an alternative to the route the vehicle is currently traveling so as to reach a service destination to address the service issue as discussed further below in connection with FIG. 3.

Display 204 may include a conventional liquid crystal display (LCD). Through display driver 203, processor 201 controls the display of text and graphics on display 204 in a predetermined format. User interface 205 may comprise conventional audio circuitry including a microphone and speaker for the user to communicate with navigation system 102 via audio media. User interface 205 may also comprise an indicator device, e.g., a mouse, touchpad, roller ball, or a combination thereof, which may enable a user to move a cursor on display 204 and to point and click at a displayed option or an icon to select same. In addition, user interface 204 may incorporate well-known touch-screen circuitry (not shown). With this circuitry, the user can interact with processor 201 by using a finger or a stylus to touch the surface of display 204, which is tactile-sensitive. Processor 201 receives from the touch screen circuitry a signal identifying the location on display 204 where it has been touched. If such a location matches the predetermined location of one of the displayed options or icons, processor 201 determines that the option or icon has been selected. Otherwise, a cursor is placed at the touched location on display 204, prompting for an input from the user.

The user input may be realized using a virtual keyboard shown on display 204 also provided by the touch-screen circuitry. In a well-known manner, characters are inputted by touching the corresponding keys on the virtual keyboard. Alternatively, processor 201 may be programmed to recognize handwritten characters, and may receive through the touch-screen circuitry images of characters drawn by the user on display 204. Any recognized characters corresponding to the drawn images then become the user input. Still alternatively, through one of external interfaces 206, navigation system 102 can be connected to a keyboard device or a personal computer (PC) having a keyboard for user input. In any of these manners, the user may input a destination to navigation system 102.

In one embodiment, navigation system 102 includes a database 208 that is configured to store map data that is used by navigation system 102 to provide driving directions to the driver of the vehicle to arrive at a destination from a current location of the vehicle.

In one embodiment, navigation system 102 further includes a communications adapter 209 for enabling navigation system 102 to communicate with automobile diagnostic system 101, such as via network 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, GPS-based navigation systems may be implemented as a stand-alone GPS unit, a GPS application on a mobile computing device (e.g., smartphone) or as a unit integrated with the vehicle's entertainment system. Currently, such GPS-based navigation systems are good at providing directions and can incorporate various types of information, such as traffic information, to provide a route to the driver that would exclude traffic congestion, accidents, etc. However, such systems do not incorporate any information from the vehicle's diagnostic system which may indicate a service issue (e.g., low fuel) that needs to be addressed. For example, the driver only becomes aware of having low fuel in response to the low fuel indicator light appearing. The driver may then open an application (e.g., GasBuddy®) on the driver's mobile computing device to attempt to identify the closest gas station. The driver would then have to enter the destination of the closest gas station in the navigation system to obtain the directions to the closest gas station. Such a process is labor intensive and inefficient. If, however, the navigation system integrated data from the vehicle's diagnostic system, then the navigation system may be able to assist the user in handing the service issue thereby improving the current process in handling such a situation.

Figure 3:
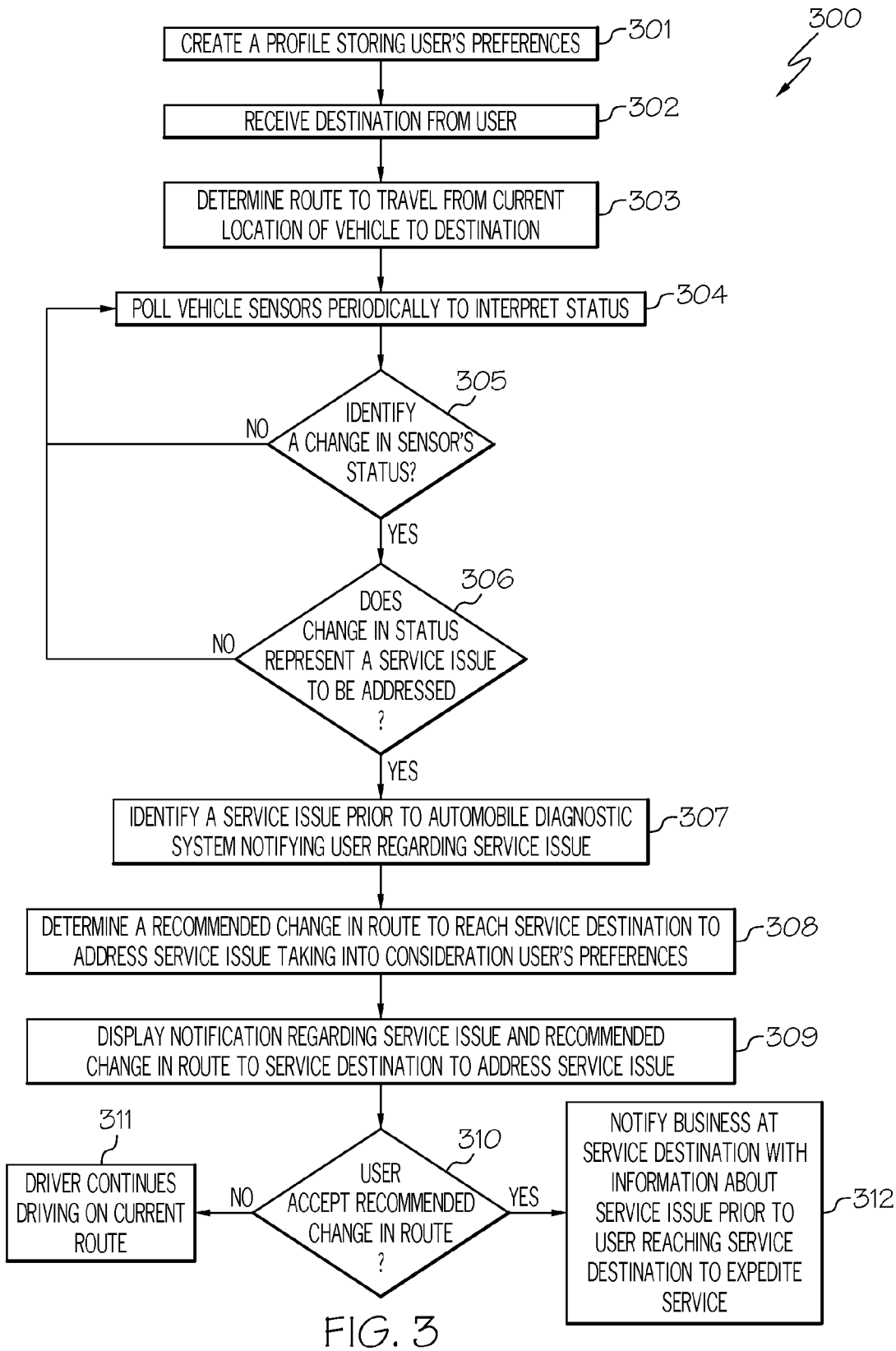
FIG. 3 is a flowchart of a method for assisting a user in handling a vehicle service issue in accordance with an embodiment of the present invention.

The principles of the present invention provide a means for the navigation system to assist the user (e.g., driver of a vehicle) in handling a service issue by having navigation system 102 (FIG. 1) identify a service issue prior to automobile diagnostic system 101 (FIG. 1) notifying the user (e.g., driver of the vehicle) regarding the service issue and recommending an alternative to the route the vehicle is currently traveling so as to reach a service destination to address the service issue as discussed below in connection with FIG. 3.

FIG. 3 is a flowchart of a method 300 for assisting a user in handling a vehicle service issue in accordance with an embodiment of the present invention.

Referring to FIG. 3, in conjunction with FIGS. 1-2, in step 301, navigation system 102 creates a profile storing preferences of the user (e.g., driver of the vehicle). "Preferences," as used herein, includes vehicle and vehicle service preferences, such as service recommendations on serviceable or consumable vehicle resources (e.g., specific gas stations, repair shops, dealerships, tire brands, etc.). The profile may further store standard vehicle specifications, such as the make and model of the vehicle, tire size, battery size, etc. The profile may additionally store user's financial information (e.g., credit card number) which may be utilized by navigation system 102 to pay for a service repair in advance of the user reaching the service destination to expedite service as discussed further below.

In step 302, navigation system 102 receives a destination from the user (e.g., driver of the vehicle). For example, the user may input the destination by using a virtual keyboard shown on display 204.

In step 303, navigation system 102 determines the route to travel from the current location of the vehicle to the destination based on map data (e.g., map data stored in database 208).

In step 304, navigation system 102 polls the vehicle sensors 104 in automobile diagnostic system 101 periodically to interpret a status. For example, navigation system 102 may poll sensor 104A to determine if there has been a change in the tire pressure. In another example, navigation system 102 may also poll sensor 104B to determine if there has been a change in the engine temperature. In a further example, navigation system 102 may poll sensor 104C to determine if there has been a change in the fuel level. A change in one of these characteristics (e.g., change in tire pressure to left-front tire from 35 psi to 33 psi) represents a change in the sensor's status (state or condition). In one embodiment, navigation system 102 may poll road sensors periodically that have sensed a characteristic of the environment that may be used by navigation system 102 to interpret a status.

In step 305, a determination is made by navigation system 102 as to whether it identified a change in the status of a sensor 104. A change in the status of a sensor 104 may indicate a serviceable or consumable vehicle resource that requires service action (e.g., low tire pressure, low gas, overheating, low fuel, low engine oil, etc.).

If there has been no change in the status of sensors 104, then navigation system 102 continues to poll the vehicle sensors 104 in automobile diagnostic system 101 periodically to interpret a status in step 304.

If, however, there has been a change in the status of a sensor 104, then, in step 306, a determination is made by navigation system 102 as to whether the change in status represents a service issue to be addressed. For example, sensor 104 indicating that the tire pressure in a particular tire has changed from 35 psi to 33 psi might not represent a service issue to be addressed. However, if sensor 104 indicated that the tire pressure in a particular tire has changed from 32 psi to 26 psi, then a service issue may be identified as having such a low tire pressure may be dangerous as it may affect the steering and increase the chance of a blowout. A "service issue," as used herein, refers to any vehicle issue that should be serviced for the safety of the vehicle occupants as well as to ensure that the vehicle continues to operate in good working order, such as by performing preventative or routine maintenance. In one embodiment, a service issue to be addressed may also be identified based on the change in status of road sensors.

If the change in status of sensor 104 does not represent a service issue to be addressed, then navigation system 102 continues to poll the vehicle sensors 104 in automobile diagnostic system 101 periodically to interpret a status in step 304.

If, however, the change in status of status 104 represents a service issue to be addressed, then, in step 307, navigation system 102 identifies a service issue prior to automobile diagnostic system 101 notifying the user (e.g., driver of the vehicle) regarding the service issue.

In step 308, navigation system 102 determines a recommended change in the route the vehicle is currently traveling to reach a service destination to address the service issue taking into consideration the user's preferences. A "change in the route," as used herein, is to include any new or alternative route for the vehicle to travel to reach a service destination to address the identified service issue. A "service destination," as used herein, refers to any destination, such as a place of business, to service the identified issue. In one embodiment, the service destination is identified based on the route the vehicle is currently traveling as well as the user's preferences, which may specify specific gas stations, repair shops, dealerships and tire brands. For example, the user may specify the Discount Tire® chain to handle all service issues relating to tires. As a result, if navigation system 102 identifies a service issue relating to tires, such as low tire pressure, then navigation system 102 will identify a Discount Tire® store to service the issue and determine a route for reaching the Discount Tire® store based on the route the vehicle is currently traveling. For instance, navigation system 102 may identify the closest Discount Tire® store in light of the route the vehicle is currently traveling.

In another example, the user may specify to use BP® gas stations for filling up the vehicle was gasoline. As a result, if navigation system 102 identifies a service issue relating to low fuel (do not want the vehicle to run out of fuel), then navigation system 102 will identify a BP® gas station to service the issue (assuming that there is one that can service the vehicle prior to running out of fuel) and determine a route for reaching the BP® gas station based on the route the vehicle is currently traveling. For instance, navigation system 102 may identify the closest BP® gas station in light of the route the vehicle is currently traveling.

In another example, the user's profile may indicate that the vehicle uses diesel fuel and requires a special additive. As a result, if navigation system 102 identifies a service issue relating to low fuel (do not want the vehicle to run out of fuel), then navigation system 102 will identify a gas station with diesel fuel and the special additive. Such a gas station will be selected in light of the route the vehicle is currently traveling.

In one embodiment, recommendations will be based on other criteria besides user's preferences and the route the vehicle is currently traveling, such as to avoid potential problems (e.g., obtaining a low fuel condition) based on the distance between exits on the road.

In step 309, navigation system 102 displays a notification to the user, such as on display 204, regarding the service issue and recommended change in the route to a service destination to address the service issue.

In step 310, a determination is made by navigation system 102 as to whether the user (e.g., driver of the vehicle) accepted the recommended change in the route.

If the user did not accept the recommended change in the route, then, in step 311, the driver continues driving on the current route.

If, however, the user accepted the recommend change in the route, then, in step 312, navigation system 102 notifies a business at the service destination (e.g., Discount Tire® store) with information about the service issue (e.g., low tire pressure in front left tire) prior to the user (e.g., driver of the vehicle) reaching the service destination to expedite service. By notifying the Discount Tire® store regarding the low tire pressure, they will be prepared to check the appropriate tire for air pressure as well as to ensure they have the appropriate tire on stock in case the tire needs to be replaced. The appropriate tire may be identified based on the tire size and preferred tire brand identified in the user's profile which is sent to the Discount Tire® store by navigation system 102. Furthermore, navigation system 102 may provide the business at the service destination (e.g., Discount Tire® store) with the user's financial information (e.g., credit card number) from the user's profile to pay for the service repair in advance of the user reaching the service destination to expedite service.

In this manner, navigation system 102 assists the user (e.g., driver of a vehicle) in handling a service issue by having navigation system 102 identify a service issue prior to automobile diagnostic system 101 notifying the user regarding the service issue and recommending an alternative to the route the vehicle is currently traveling so as to reach a service destination to address the service issue. Such a process is much more efficient than the current process in handling such service issues.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assisting a user in handling a vehicle service issue, the method comprising:
    creating a profile storing a user's vehicle and vehicle service preferences, wherein said user's vehicle and vehicle service preferences comprise specific gas stations, repair shops, dealerships and tire brands, wherein said profile further stores standard vehicle specifications comprising make and model of said user's vehicle, tire size and battery size, wherein said profile further stores financial information of said user;
    receiving a destination from a user;
    determining a route to travel from a current location of said vehicle to said destination;
    polling sensors in an automobile diagnostic system of said vehicle periodically to interpret a status;
    detecting a change in said status of a sensor in said sensors of said automobile diagnostic system;
    identifying a service issue in response to said change in said status of said sensor prior to said automobile diagnostic system notifying said user regarding said service issue;
    determining, by a processor, a recommended change in said route to reach a service destination to address said service issue taking into consideration said user's vehicle and vehicle service preferences, said route said vehicle is currently traveling and a distance between exits on a road in response to identifying said service issue; and
    displaying a notification to said user regarding said service issue and said recommended change in said route to reach said service destination to address said service issue.

2. The method as recited in claim 1 further comprising:
    notifying a business at said service destination with information about said service issue prior to said user reaching said service destination to expedite service in response to said user accepting said recommended change in said route.

3. The method as recited in claim 2, wherein said business at said service destination is provided said user's financial information prior to said user reaching said service destination to expedite service.

4. The method as recited in claim 1, wherein said change in said status of said sensor indicates a serviceable or consumable vehicle resource that requires service action.

5. The method as recited in claim 1, wherein said service destination is identified based on said route, said service issue and said user's vehicle and vehicle service preferences.

6. A computer program product for assisting a user in handling a vehicle service issue, the computer program product comprising a computer readable storage medium having program code embodied therewith, the program code comprising the programming instructions for:
creating a profile storing a user's vehicle and vehicle service preferences, wherein said user's vehicle and vehicle service preferences comprise specific gas stations, repair shops, dealerships and tire brands, wherein said profile further stores standard vehicle specifications comprising make and model of said user's vehicle, tire size and battery size, wherein said profile further stores financial information of said user;
receiving a destination from a user;
determining a route to travel from a current location of said vehicle to said destination;
polling sensors in an automobile diagnostic system of said vehicle periodically to interpret a status;
detecting a change in said status of a sensor in said sensors of said automobile diagnostic system;
identifying a service issue in response to said change in said status of said sensor prior to said automobile diagnostic system notifying said user regarding said service issue;
determining a recommended change in said route to reach a service destination to address said service issue taking into consideration said user's vehicle and vehicle service preferences, said route said vehicle is currently traveling and a distance between exits on a road in response to identifying said service issue; and
displaying a notification to said user regarding said service issue and said recommended change in said route to reach said service destination to address said service issue.

7. The computer program product as recited in claim 6, wherein the program code further comprises the programming instructions for:
notifying a business at said service destination with information about said service issue prior to said user reaching said service destination to expedite service in response to said user accepting said recommended change in said route.

8. The computer program product as recited in claim 7, wherein said business at said service destination is provided said user's financial information prior to said user reaching said service destination to expedite service.

9. The computer program product as recited in claim 6, wherein said change in said status of said sensor indicates a serviceable or consumable vehicle resource that requires service action.

10. The computer program product as recited in claim 6, wherein said service destination is identified based on said route, said service issue and said user's vehicle and vehicle service preferences.

11. A system, comprising:
a memory unit for storing a computer program for assisting a user in handling a vehicle service issue; and
a processor coupled to the memory unit, wherein the processor is configured to execute the program instructions of the computer program comprising:
creating a profile storing a user's vehicle and vehicle service preferences, wherein said user's vehicle and vehicle service preferences comprise specific gas stations, repair shops, dealerships and tire brands, wherein said profile further stores standard vehicle specifications comprising make and model of said user's vehicle, tire size and battery size, wherein said profile further stores financial information of said user;
receiving a destination from a user;
determining a route to travel from a current location of said vehicle to said destination;
polling sensors in an automobile diagnostic system of said vehicle periodically to interpret a status;
detecting a change in said status of a sensor in said sensors of said automobile diagnostic system;
identifying a service issue in response to said change in said status of said sensor prior to said automobile diagnostic system notifying said user regarding said service issue;
determining a recommended change in said route to reach a service destination to address said service issue taking into consideration said user's vehicle and vehicle service preferences, said route said vehicle is currently traveling and a distance between exits on a road in response to identifying said service issue; and
displaying a notification to said user regarding said service issue and said recommended change in said route to reach said service destination to address said service issue.

12. The system as recited in claim 11, wherein the program instructions of the computer program further comprises:
notifying a business at said service destination with information about said service issue prior to said user reaching said service destination to expedite service in response to said user accepting said recommended change in said route.

13. The system as recited in claim 12, wherein said business at said service destination is provided said user's financial information prior to said user reaching said service destination to expedite service.

14. The system as recited in claim 11, wherein said change in said status of said sensor indicates a serviceable or consumable vehicle resource that requires service action.

15. The system as recited in claim 11, wherein said service destination is identified based on said route, said service issue and said user's vehicle and vehicle service preferences.

* * * * *